United States Patent
Rademacher

(10) Patent No.: US 7,139,311 B2
(45) Date of Patent: Nov. 21, 2006

(54) METHOD AND STATE REDUCTION IN AN EQUALIZER

(75) Inventor: Leo Rademacher, Holzkirchen (DE)

(73) Assignee: Siemens Aktiengesellschaft, Munich (DE)

( * ) Notice: Subject to any disclaimer, the term of this patent is extended or adjusted under 35 U.S.C. 154(b) by 628 days.

(21) Appl. No.: 10/275,298

(22) PCT Filed: Apr. 30, 2001

(86) PCT No.: PCT/EP01/04866

§ 371 (c)(1),
(2), (4) Date: Nov. 4, 2002

(87) PCT Pub. No.: WO01/84795

PCT Pub. Date: Nov. 8, 2001

(65) Prior Publication Data

US 2003/0185293 A1   Oct. 2, 2003

(30) Foreign Application Priority Data

Nov. 8, 2001  (GB) ................................ 0010545.2

(51) Int. Cl.
   *H03K 5/159*   (2006.01)
   *G06F 17/10*   (2006.01)
(52) U.S. Cl. ................. 375/229; 372/232; 372/240.29; 708/322; 708/323
(58) Field of Classification Search ............ None
See application file for complete search history.

(56) References Cited

U.S. PATENT DOCUMENTS

| | | | | |
|---|---|---|---|---|
| 5,251,237 A | | 10/1993 | Baier .......................... 375/99 |
| 5,546,430 A | * | 8/1996 | Liao et al. ................... 375/341 |
| 5,644,603 A | * | 7/1997 | Ushirokawa ................. 375/341 |
| 5,870,433 A | * | 2/1999 | Huber et al. ................. 375/233 |
| 6,044,111 A | * | 3/2000 | Meyer et al. ................ 375/231 |
| 6,356,586 B1 | * | 3/2002 | Krishnamoorthy et al. . 375/233 |
| 6,373,888 B1 | * | 4/2002 | Lindoff ........................ 375/231 |
| 6,775,322 B1 | * | 8/2004 | Zangi et al. ................. 375/232 |
| 7,042,938 B1 | * | 5/2006 | Malkov et al. .............. 375/233 |

FOREIGN PATENT DOCUMENTS

EP   0 425 458 A   9/1990

* cited by examiner

*Primary Examiner*—Kevin Kim
*Assistant Examiner*—Linda Wong
(74) *Attorney, Agent, or Firm*—Crowell & Moring LLP

(57) ABSTRACT

An equalizer apparatus comprises a first filter (406) having a first respective plurality of filter coefficients, a channel model filter (414) having a plurality of model filter coefficients, and an adaptive algorithm unit (416). The adaptive algorithm unit (416) is arranged to adapt at least a first predetermined number of the first respective plurality of filter coefficients and at least a second predetermined number of the plurality of model filter coefficients in response to an error signal (e) corresponding to a difference in filter output signals from the first filter and the channel model filters (406, 414). The adaptive algorithm unit (416) operates in accordance with a respective state channel estimation technique. The respective state channel estimation technique is adapted so as to reduce a number of states allocatable to at least one of the plurality of state-defining taps, thereby reducing an overall number of states definable associated with the plurality of state-defining taps. The channel model filter (414) is adapted a number of times corresponding to the reduced overall number of states.

8 Claims, 6 Drawing Sheets

METHOD AND STATE REDUCTION IN AN EQUALIZER

The present invention relates to an equaliser apparatus and a method of state reduction for the equaliser apparatus, the equaliser apparatus being of the type comprising a pre-filter and a channel model filter.

In the field of digital radio communications, adaptive equalisation is a method of pre-processing a signal based upon the characteristics of a radio link. The characteristics of the radio link, or channel, can be estimated by transmitting a predetermined sequence of information to the receiver. However, since the radio link changes constantly, the equalisation must be continually changed to match the changing radio link conditions.

Respective State Estimation (RSE) is a channel estimation technique involving the generation of different channel models instead of generating a single channel model for all states. Different channel models are generated by the adaptation of coefficients of a channel model filter of an equaliser for each state, each state being defined by a received signal indicating a possible combination of states. RSE is disclosed in European Patent Number EP-B1-0 425 458.

In a Global System for Mobile communications (GSM), Binary Phase Shift Keying (BPSK) is employed as a modulation technique. With the introduction of Enhanced Data rates for GSM Evolution (EDGE), a greater number of states can be defined by the use of an 8-PSK modulation technique by EDGE. Since the amount of signal processing associated with RSE is related to the number of possible states, the processing demands upon a Digital Signal Processor (DSP) are significantly increased when employing the 8-PSK modulation technique over the processing demands on an equaliser supporting the BPSK modulation technique. Therefore, it is necessary to reduce considerably the number of states in order to ease processing demands on the DSP.

State reduction techniques are known for Viterbi-type algorithms, for example, symbol-by-symbol Maximum a-posteriori (MAP) detection. In such state reduction techniques, several states are combined into a unique superstate in such a way so as to maximise the minimum distance between channel coefficients vectors. However, once combined the several states can no longer be distinguished in the future detection process and so such maximisation of the minimum distance between channel coefficients vectors causes a large error signal when applied to the problem of state reduction for channel estimation purposes.

It is therefore an object of the present invention to obviate or at least mitigate the above described disadvantages in relation to channel estimation. According to the present invention there is provided an equaliser apparatus comprising a channel model filter having a plurality of model filter coefficients and a plurality of state defining taps, and an adaptive algorithm unit arranged to adapt at least a first predetermined number of the plurality of model filter coefficients in response to an error signal calculated using an output signal from the channel model filter, wherein the adaptive algorithm unit operates in accordance with a respective state channel estimation technique, the respective state channel estimation technique being adapted so as to reduce a number of states allocatable to at least one of the plurality of state-defining taps, thereby reducing an overall number of states definable associated with the plurality of state-defining taps, the channel model filter being adapted a number of times corresponding to the reduced overall number of states.

Preferably, a number of sub-superstates are allocated to each tap independently of the other taps.

Preferably, the number of sub-superstates allocated to each tap is in dependence of the power of each signal of the each tap.

Preferably, the apparatus further comprises at least one pre-filter having a respective plurality of pre-filter coefficients, the adaptive algorithm unit being arranged to also adapt at least a second predetermined number of the respective plurality of pre-filter coefficients in response to the error signal, the error signal being calculated using a respective at least one output signal from the at least one pre-filter and the output signal from the channel model filter.

Preferably, the channel model filter and the at least one pre-filter are adapted the number of times corresponding to the reduced overall number of states.

According to the present invention, there is also provided, a method of channel estimation for an equaliser apparatus comprising a channel model filter having a plurality of model filter coefficients and a plurality of state-defining taps, and an adaptive algorithm unit arranged to adapt at least a first predetermined number of the plurality of model filter coefficients in response to an error signal calculated using an output signal from the channel model filter, wherein the adaptive algorithm unit operates in accordance with a respective state channel estimation technique, the method comprising the steps of: reducing a number of states allocatable to at least one of the plurality of state-defining taps so as to reduce an overall number of states definable associated with the plurality of state-defining taps and adapting the channel model filter a number of times corresponding to the reduced overall number of states.

It is thus possible to provide a reduction of states by a factor of 8, 4, 2 or 1 (i.e. without changes) per tap by erasing 3, 2, 1 or 0 LSBs, respectively, of each NT−1 bit octal digit in a state number. Hence a 3-bit (octal), 2-bit (quaternary), 1-bit (unitary) or 0-bit (vanishing) sub-superstate number is allocated to each tap. By reducing the number of states, the complexity of the equaliser apparatus is reduced, thereby making processing of 8-PSK signals viable.

At least one embodiment of the invention will now be described, by way of example only, with reference to the accompanying drawings, in which.

Throughout the following description like parts will be identified by identical reference numerals.

Figure 1:
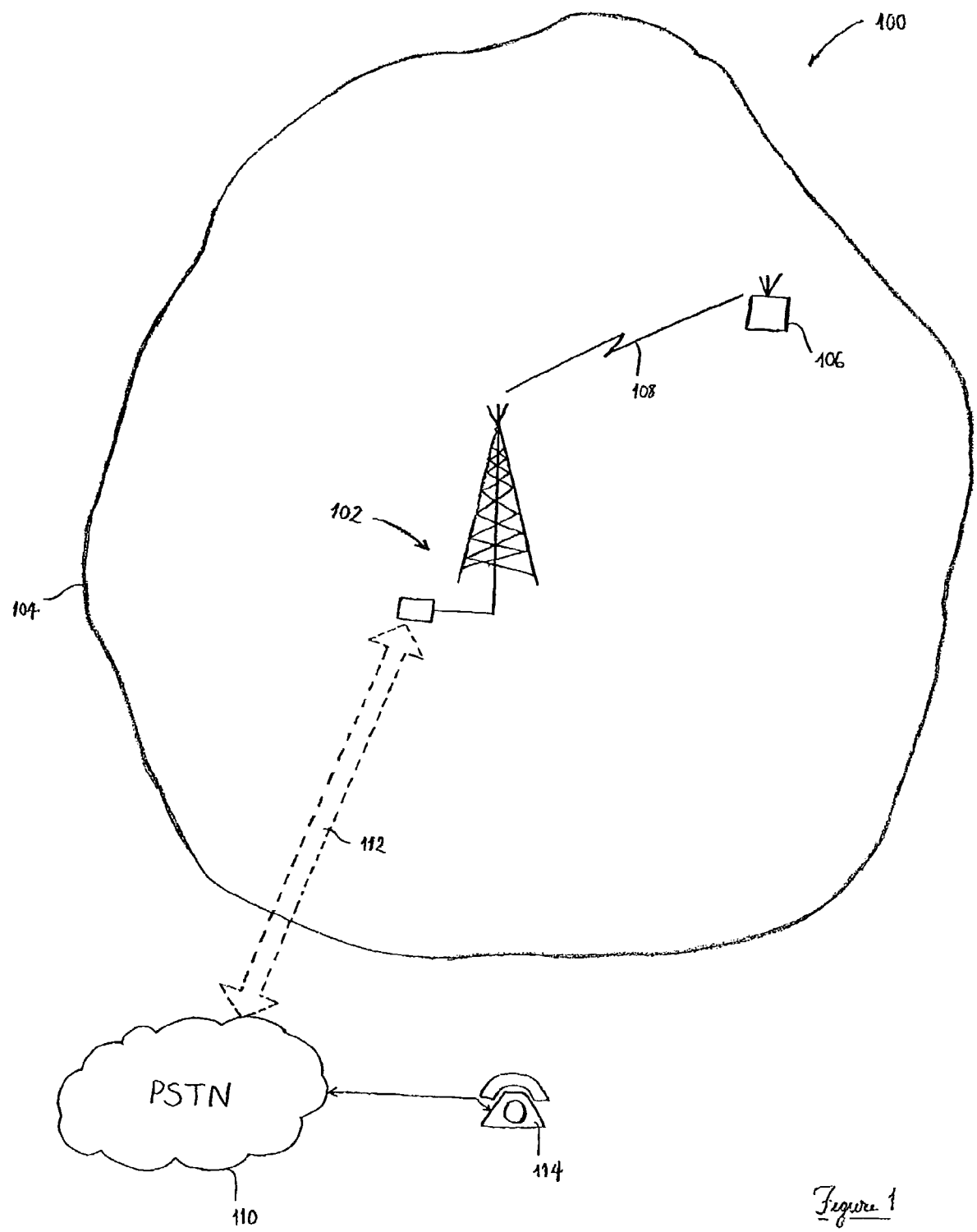
FIG. 1 is a schematic diagram of an apparatus constituting a communications link.

In a cellular telecommunications network supported by, for example, an EDGE system 100 (FIG. 1), a base station 102 supports a geographical area, or cell 104, the base station 102 being in communication with a mobile subscriber unit 106 via a radio frequency (RF) interface 108.

As an example only, communications between the base station 102 and a Public Switched Telecommunications Network (PSTN) 110 can be supported by any telecommunications architecture 112 known in the art. A fixed-line telephone 114 is also coupled to the PSTN 110.

It should be appreciated that although reference has been made above to particular types of terminals, other terminals can be used instead of the base station 102 or the mobile subscriber unit 106,including, for example, fixed cellular terminals, or laptop computers/PDAs suitably adapted to function within the EDGE system 100. Similarly, although a fixed-line telephone 114 has been described above, other communications devices are envisaged, for example, a personal computer (PC) and a modem, or another mobile subscriber unit operating in the EDGE system.

Figure 2:
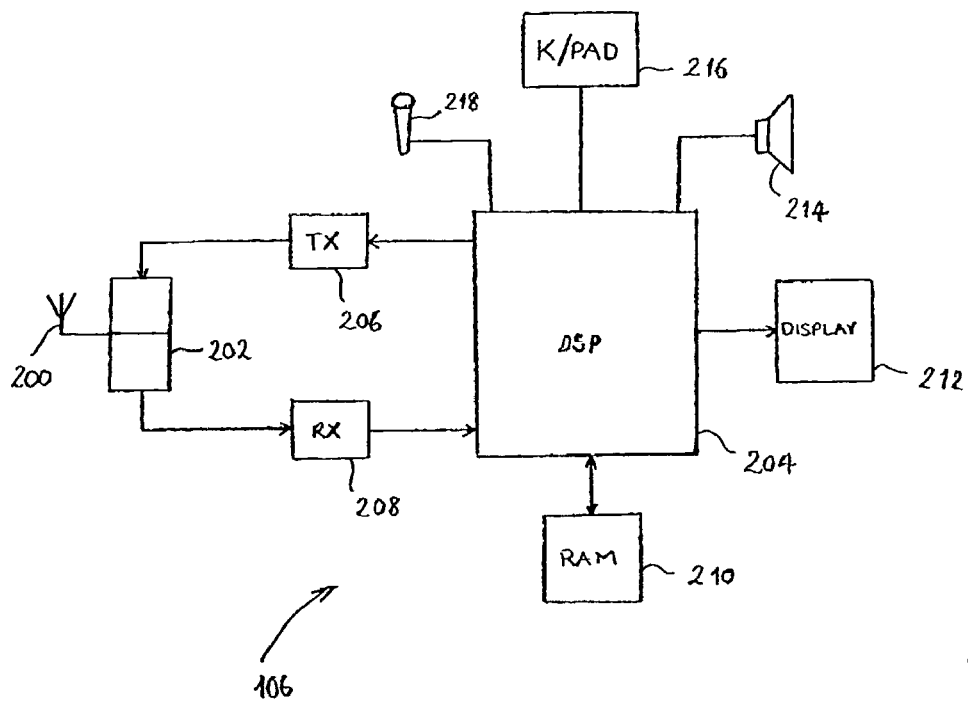
FIG. 2 is a schematic diagram of a mobile terminal shown in FIG. 1.

Referring to FIG. 2, the mobile subscriber unit 106 comprises a terminal antenna array 200 coupled to a terminal duplexer 202. A first terminal of the terminal duplexer 202 is coupled to a terminal DSP 204 via a terminal transmitter chain 206. Similarly, a second terminal of the terminal duplexer 202 is coupled to the terminal DSP 204 via a terminal receiver chain 208.The terminal DSP 204 is coupled to a terminal Random Access Memory (RAM) 210, a display 212, for example, a liquid crystal display, a speaker unit 214, a keypad 216 and a microphone 218.

Figure 3:
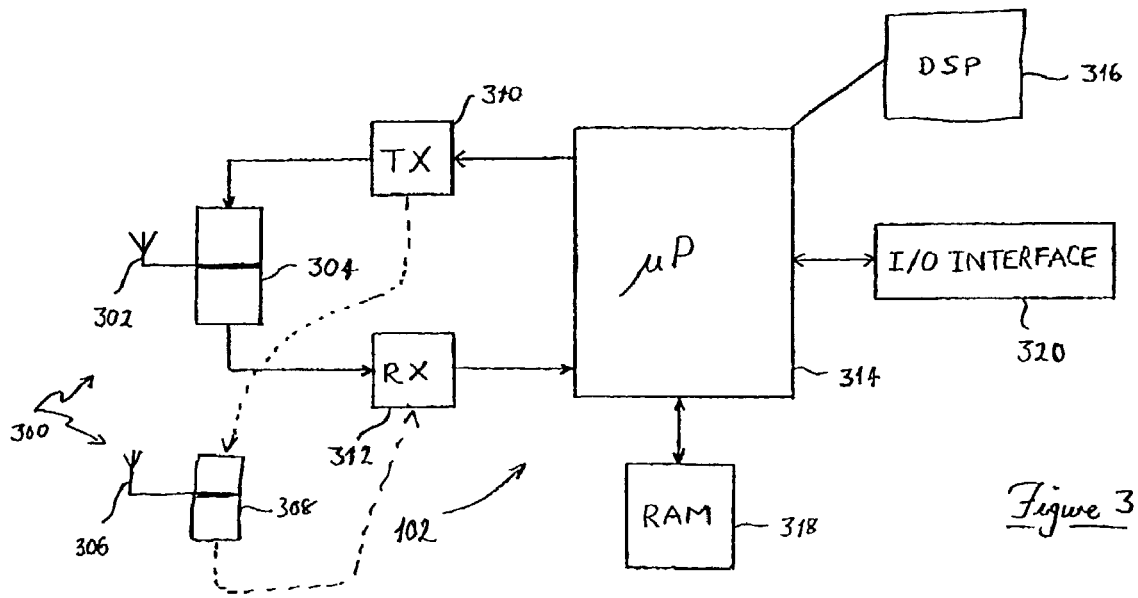
FIG. 3 is a schematic diagram of a base station shown in FIG. 1.

The base station 102 (FIG. 3) comprises a base station antenna array 300 comprising a first antenna element 302 coupled to a first base station duplexer 304 and a second antenna element 306 coupled to a second base station duplexer 308. A first terminal of the first and second base station duplexers 304, 308 are coupled to a base station microprocessor 314 via a base station transmitter chain 310. Similarly, a second terminal of the first and second base station duplexers 304, 308 are coupled to the base station microprocessor 314 via a base station receiver chain 312.

The base station microprocessor 314is coupled to a DSP unit 316 and a base station RAM 318.Information is communicated to and from other parts of the cellular telecommunications network (not shown) by means of an I/O interface 320 coupled to the base station microprocessor 314.

Figure 4:
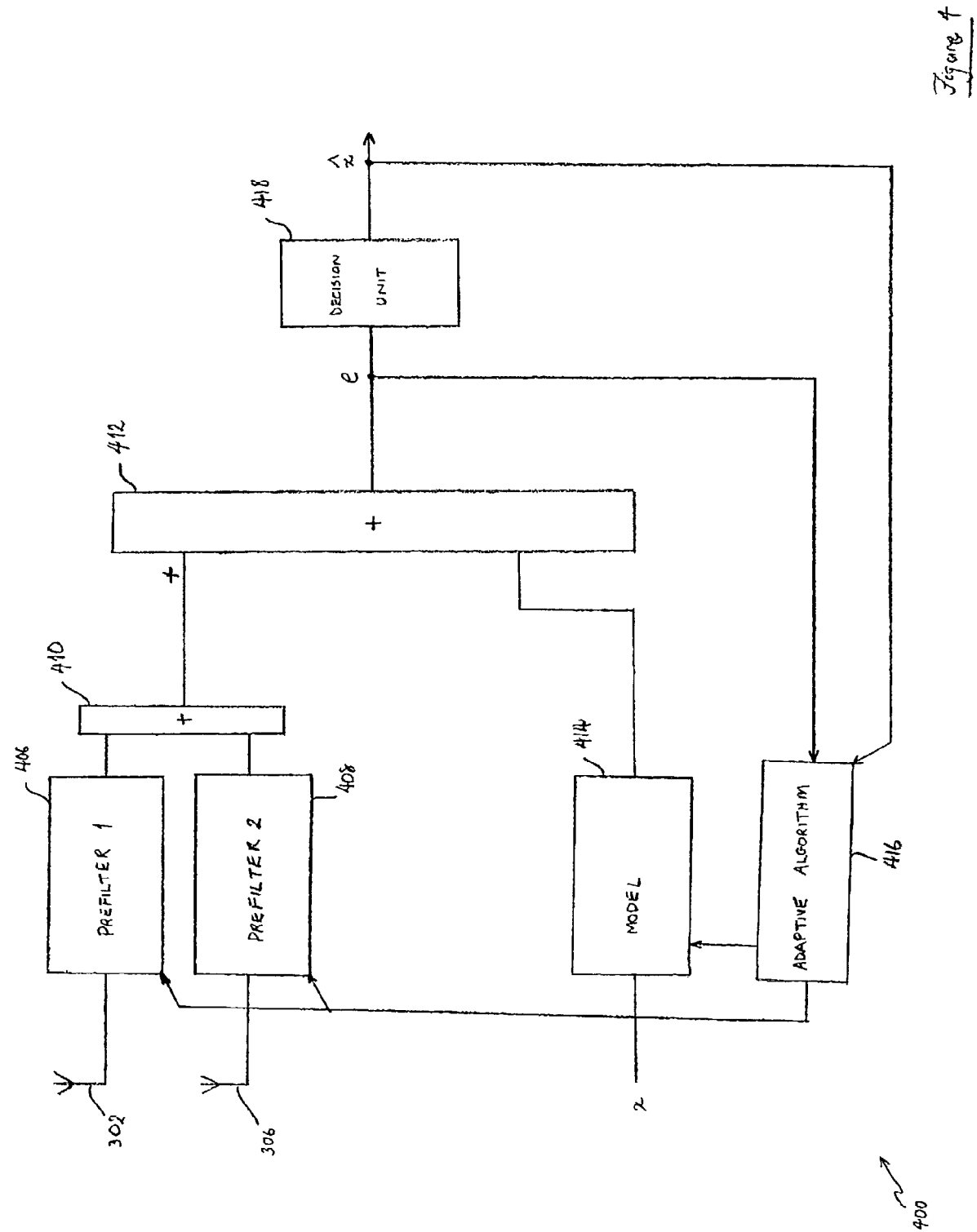
FIG. 4 is a schematic diagram of an equaliser constituting an embodiment of the invention.

Referring to FIG. 4, either or both of the DSP 204 (FIG. 2) and the DSP unit 316 are arranged to provide an adaptive equaliser circuit 400. For the purpose of completeness, the following examples will be described in relation to the base station 102, and for the purpose of simplicity of description and hence clarity, the following examples will be described in the context of the antenna array 300 comprising two antenna elements. However, it should be appreciated that a greater or fewer number of antenna elements can be provided.

The first antenna element 302 and the second antenna element 306 are respectively coupled to a first pre-filter 406 comprising a first transversal filter and a second pre-filter 408 comprising a second transversal filter. Both the first and second pre-filters 406, 408 are coupled to a first summation unit 410, the first summation unit 410 being coupled to a second summation unit 412. A channel model unit 414 comprises a third transversal filter and is also coupled to the second summation unit 412 as well as an adaptive algorithm unit 416, the adaptive algorithm unit 416 being coupled to the first and second pre-filters 406, 408, an output terminal of the second summation unit 412 and an output terminal of a decision unit 418. The output terminal of the second summation unit 412 is also coupled to an input terminal of the decision unit 418.

The adaptive algorithm unit 416 executes an adaptive algorithm, for example, a Least Mean Square (LMS) algorithm in order to adapt coefficients of the first and second pre-filters 406, 408, and the channel model unit 414. It should be appreciated that although, in the present example, the LMS algorithm has been specified, other adaptive algorithms known in the art can be used.

Figure 5:
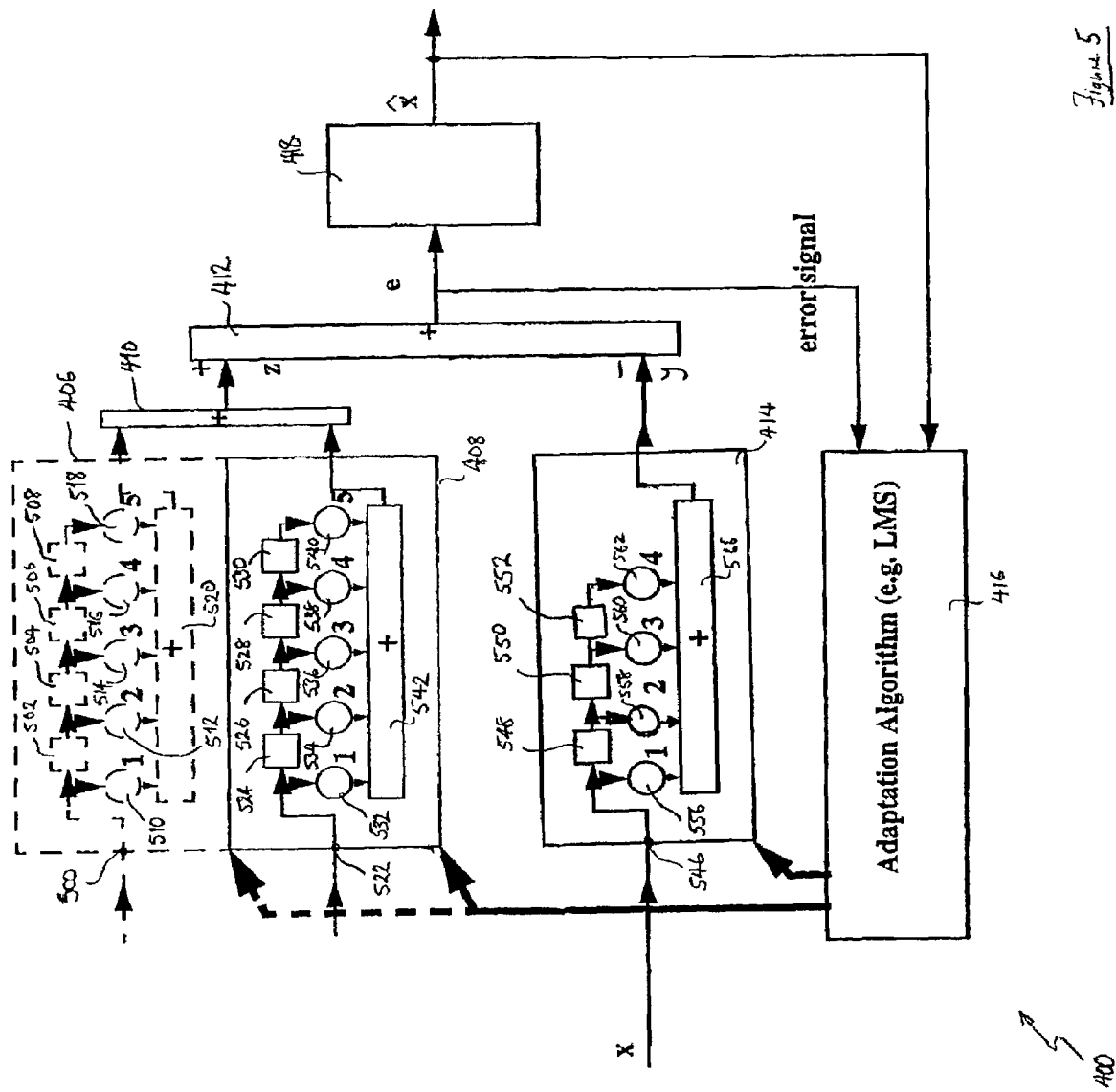
FIG. 5 is a schematic diagram of the equaliser of FIG. 4 shown in greater detail.

Referring to FIG. 5, the first pre-filter 406 comprises a first, second, third and fourth delay 502, 504, 506, 508. A first pre-filter input terminal 500 is coupled to an input terminal of the first delay 502 and a first multiplier 510 of the first pre-filter 406. The first pre-filter input terminal 500 is also coupled to the first antenna element (not shown). An input terminal of the second delay 504 and an output terminal of the first delay 502 are coupled to a second multiplier 512 of the first pre-filter 406. An input terminal of the third delay 506 and an output terminal of the second delay 504 are coupled to a third multiplier 514 of the first pre-filter 406.An input terminal of the fourth delay 508 and an output terminal of the third delay 506 are coupled to a fourth multiplier 516 of the first pre-filer 406. A fifth multiplier 518 of the first pre-filter 406 is coupled to an output terminal of the fourth delay 508. The first, second, third, fourth and fifth multipliers 510, 512, 514, 516, 518 of the first pre-filter 406 are coupled to a first pre-filter summation unit 520, the first pre-filter summation unit 520 being coupled to the first summation unit 410. The first, second, third and fourth delays 502, 504, 506, 508, the first, second, third, fourth and fifth multipliers 510, 512, 514, 516, 518 and the first pre-filter summation unit 520 are connected to form the first transversal filter.

The second pre-filter 408 comprise a first, second, third and fourth delay 524, 526, 528, 530. A second pre-filter input terminal 522 is coupled to an input terminal of the first delay 524 and a first multiplier 532 of the second pre-filter 408. The second pre-filter 408 also comprises a second, third, fourth and fifth multiplier 534, 536, 538, 540 and a second pre-filter summation unit 542. The delays 524, 526, 528, 530, multipliers 532, 534, 536, 538, 540 and the second pre-filter summation unit 542 of the second pre-filter 408 are connected to form the second transversal filter.

The channel model unit 414 comprises a channel model unit input terminal 546 coupled to an input terminal of a first delay 548 and a first multiplier 556, an output terminal of the first delay 548 being coupled to an input terminal of a second delay 550 and a second multiplier 558. An output terminal of the second delay 550 is coupled to a third multiplier 560 and an input terminal of a third delay 552, an output terminal of the third delay 552 being coupled to a fourth multiplier 562 of the channel model unit 414. The first, second, third and fourth multipliers 556, 558, 560, 562 of the channel model unit 414 are coupled to a channel model summation unit 566, an output terminal of the channel model summation unit 566 being coupled to the second summation unit 412. The first, second and third delays 548, 550, 552 the first, second, third and fourth multipliers 556, 558, 560, 562 and the channel model summation unit 566 are connected to form the third transversal filter. The input terminal 546 of the channel model unit 414 is coupled to an input signal source (not shown), for example, a training sequence.

In the above described example apparatus, 4 ($NT_s$=NT−1) taps are used to define $8^3$ ($N_S=M^{NT-1}=8^{NT-1}$) states (hereinafter referred to as "state-defining taps"). The number of each state is represented by the NT−1 digit octal number.

The equaliser 400 is arranged to perform RSE, i.e. a separate channel estimation is calculated for each state. In order to implement RSE, the adaptive algorithm unit 416 adapts channel coefficients for all states. However, in accordance with a first embodiment of the invention the number of states is reduced prior to adaptation of all filter coefficients. State reduction is carried out for the channel model unit 414 by reducing each digit of the NT−1 digit octal number to a quaternary, a binary or even a unitary number represented by superstates comprising at least one symbol, the superstates being allocated on a tap-by-tap basis. Before allocating the superstates for each tap of the channel model unit 414, a maximum reduced number of states, R, needs to be determined by the DSP 316 for the channel model unit 414. The maximum reduced number of states, R, which can be allocated depends upon complexity constraints, for example, processing power of the DSP 316. Once the maximum reduced number of states R has been determined, a first state-defining tap of the channel model unit 414 is selected and an absolute value of the tap coefficient (the tap coefficient being proportional to signal power) is calculated. Thereafter, a decision is made based upon the tap coefficient of the first state-defining tap whether or not to reduce the number of states associated with the first state-defining tap by allocation of a superstate.

Figure 6A:
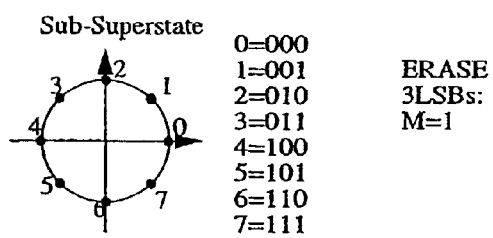
FIG. 6 is a schematic diagram of sub super state according to an embodiment of the present invention.
Figure 6B:
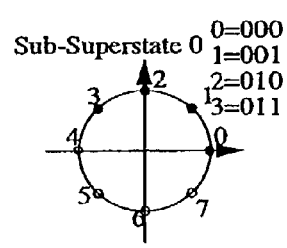
Figure 6B:
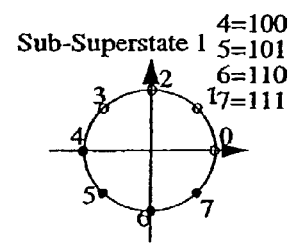

Referring to FIG. 6a, a most drastic reduction in the number of states is by a factor of 8. By combining all 8 states for a tap under consideration, a single sub-superstate of only M=1 sub-superstate is used for the tap under consideration. Referring to FIG. 6b, a reduction by a factor of 4 is achieved by defining M=2 sub-superstates of 4 symbols each. Sub-superstate 0 (in binary) contains the symbol numbers: 0=000 (octal=binary), 1=001, 2=010 and 3=011, having a Most Significant Bit (MSB) of 0. Sub-superstate 1 (in binary) contains the symbol numbers: 4=100, 5=101, 6=110 and 7=111, having an MSB of 1. Hence, there are M=2 super-states and the MSB of the state symbol numbers in each sub-superstate denotes the sub-superstate number.

Figure 6C:
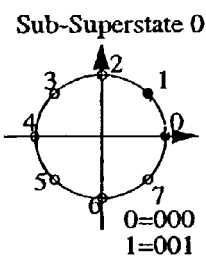
Figure 6C:
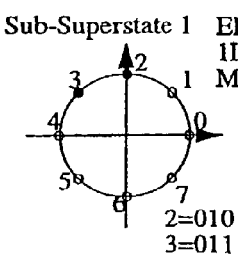
Figure 6C:
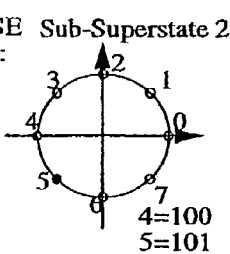
Figure 6C:
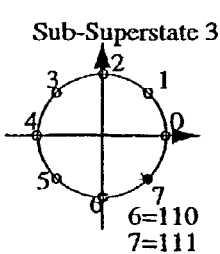

Referring to FIG. 6c, a reduction by a factor of 2 is achieved by defining M=4 sub-superstates of 2 symbols each, the 2 MSBs of the state symbol numbers denoting the sub-state quaternary number. Sub-superstate 0 contains the symbol numbers 0=000 and 1=001 having 2 MSBs of 0=00 (in quaternary=binary). Sub-superstate 1 contains the symbol numbers 2=010 and 3=011 having 2 MSBs of 1=01. Sub-superstate 2 contains the symbol numbers 4=100 and 5=101 having 2MSBs of 2=10. Sub-superstate 3 contains the symbol numbers 6=110 and 7=111 having 2 MSBs of 3=11.

Hence, if the first state-defining tap has a large coefficient, more sub-superstates are allocated to the first state-defining tap than would be allocated to a tap having a small coefficient, because taps having larger coefficients have a greater influence on the error signal. This procedure is repeated for subsequent state-defining taps of the channel model unit 414.

As an example, consider a state represented by 3 3-bit octal digits: $A_1A_2A_3$ $B_1B_2B_3$ $C_1c_2C_3$, $A_1A_2A_3$ constituting the bits of the first octal digit, $B_1B_2B_3$ constituting the bits of the second octal digit, and $C_1C_2C_3$ constituting the bits of the third octal digit.

Referring to Table 1 below, the above methodology can be further demonstrated by considering the three state-defining taps of the channel model unit 414 between: the first delay 548 and the second delay 550 (tap 1) the second delay 550 and the third delay 552 (tap 2), and the third delay 552 and the fourth delay 554 (tap 3). At each of taps 1, 2 and 3 is a signal indicative of one of the above 3 octal digits: $A_1A_2A_3$, $B_1B_2B_3$, $C_1C_2C_3$. The adaptive algorithm unit 414 examines the power at each of tap 1, tap 2 and tap 3 and, for each of taps 1, 2 and 3, assigns a predetermined number of sub-superstates in response to a level of power at each of taps 1, 2 and 3.

TABLE 1

| TAP 1 | TAP 2 | TAP 3 |
| --- | --- | --- |
| $A_1A_2A_3$ | $B_1B_2B_3$ | $C_1C_2C_3$ |
| Reduce to 4 sub-super states | Reduce to 1 sub-super state | Reduce to 2 sub-super states |
| $A_1$ $A_2$ 0 | 0 0 0 | $C_1$ 0 0 |

The level of power at a given tap is an indication of the contribution to channel estimation of the given tap. Consequently, if the power at tap 1 is quite strong, 4 sub-superstates are assigned to tap 1. If the power at tap 2 is very weak, 1 sub-superstate is assigned to tap 2, and if the power at tap 3 is poor, 2 sub-superstates are assigned to tap 3. Therefore, it can be seen from the example of Table 1 that 3 binary digits, $A_1A_2C_1$, are now used to define a reduced number of states, the reduced number of states being $2^3$ (8).

Figure 7:
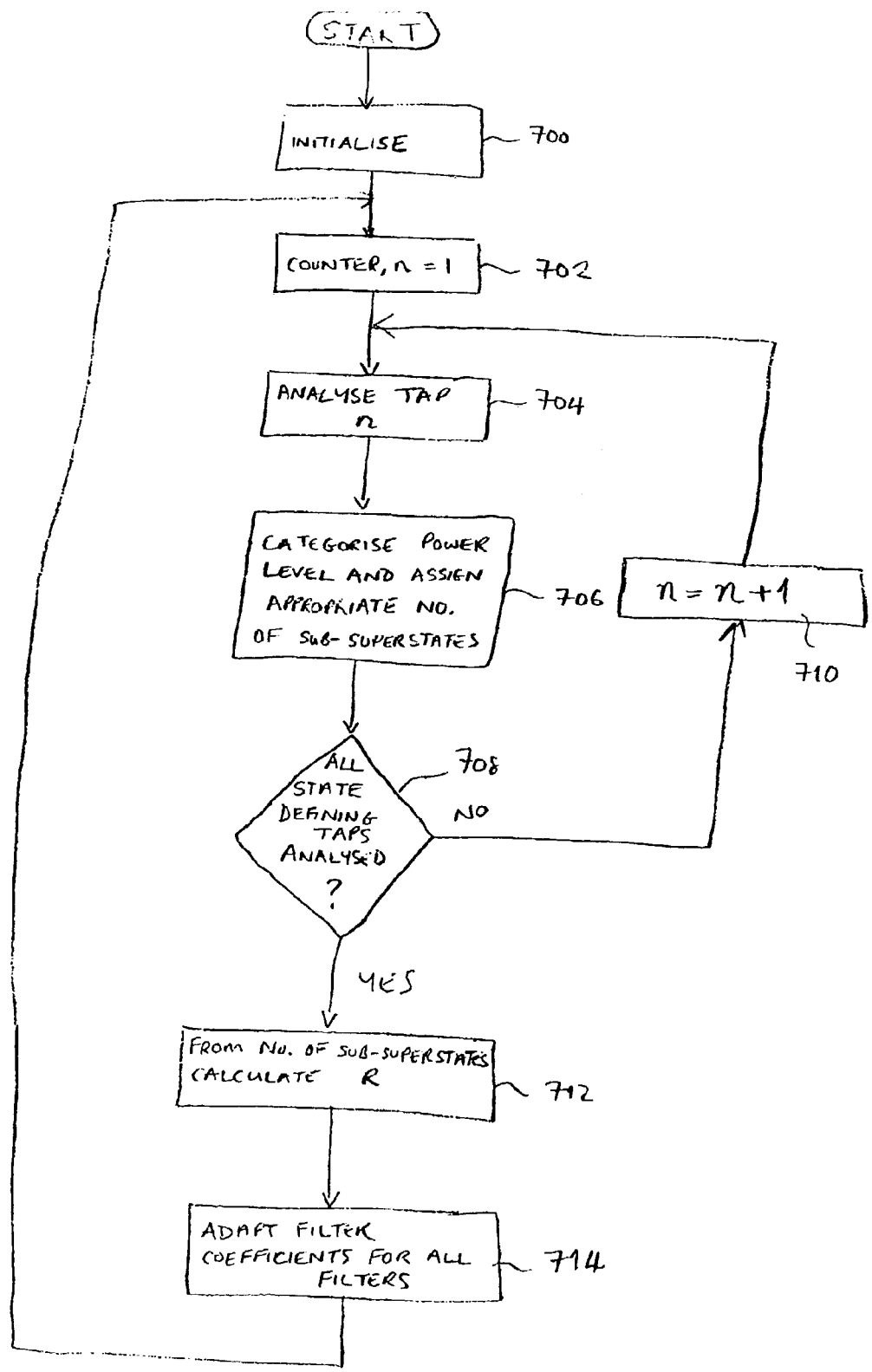
FIG. 7 is a flow diagram of operation of the equaliser of FIGS. 4 to 6.

In operation (FIG. 7), the first pre-filter 406, the second pre-filter 408 and the channel model filter 414 are initialised (step 700) according to any appropriate initialisation technique known in the art and the maximum reduced number of states, R, is determined. A counter variable, n, is then initialised (step 702) and the power at the $n^{th}$ tap is determined (step 704) by analysing the coefficient of the $n^{th}$ tap, because the square of a given tap coefficient is approximately proportional to the power at the given tap. The power at the $n^{th}$ tap is categorised in accordance with a first categorisation and an appropriate number of sub-superstates assigned (step 706) to the $n^{th}$ tap in response to the first categorisation using a look-up table. The adaptive algorithm unit 416 then verifies that all state-defining taps have been analysed (step 708). If it is found that unanalysed state-defining defining taps remain, the counter, n, is incremented (step 710) and a subsequent tap is analysed (steps 704 to 708). Each time sub-superstates are assigned to state-defining taps the adaptive algorithm unit 416 ensures that the budget of the maximum reduced number of states, R, is not exceeded. If all state defining taps have been analysed, the adaptive algorithm unit 416 adapts the coefficients of the first pre-filter 406, the second pre-filter 408 and the channel model unit 414 (step 714) R times.

In this way, the number of times each tap coefficient of the channel model unit 414, the first pre-filter 406 and the second pre-filter 408 is adapted by the adaptive algorithm unit 416 is significantly reduced, because the number of states has been reduced; each tap coefficient is adapted once per state.

Although, in the above example, the channel model unit 414 comprises three taps, it should be appreciated that the channel model filter unit 414 can comprise a greater or fewer number of taps.

In a second embodiment of the invention, the analysis of the state-defining taps is repeated using a revised categorisation scheme in order to try to further reduce the number of states associated with each state-defining tap of the channel model unit 414, i.e. to assign a further, reduced, number of sub-superstates for each state-defining tap. Subsequently, for the first and second pre-filter 406, 408, all the coefficients of the first and second pre-filter taps 406, 408 are adapted by the adaptive algorithm unit 416 the original number of times previously described for the first categorisation. The channel model unit 414 is then adapted the number of times corresponding to the new number of reduced states based upon the revised categorisation.

Although the above second embodiment has been described in relation to a revised adaptation of the coefficients of the channel model unit 414 in a third embodiment of the invention, the analysis of the state-defining taps in accordance with the second embodiment of the invention can be extended to the taps of the first and/or second pre-filters 406, 408 to further reduce the number of adaptations of the first and second pre-filters 406, 408.

The invention claimed is:

1. An equaliser apparatus comprising:
    a channel model filter having a plurality of model filter coefficients and a plurality of state defining taps; and
    an adaptive algorithm unit configured to adapt at least a first predetermined number of the plurality of model filter coefficients in response to an error signal calculated using an output signal from the channel model filter; wherein,
    the adaptive algorithm unit operates in accordance with a respective state channel estimation technique that is adapted to reduce a number of states that are allocatable to at least one of the plurality of state-defining taps, thereby reducing an overall number of states definable associated with the plurality of state-defining taps;
    the number of states is reduced by reducing each digit of an octal number to a number represented by super-states, comprising at least one symbol; and
    the channel model filter is adapted a number of times corresponding to the reduced overall number of states.

2. The apparatus as claimed in claim 1, wherein a number of sub-superstates are allocated to each tap, independently of the other taps.

3. The apparatus as claimed in claim 2, wherein the number of sub-superstates allocated to each tap is dependent on the power of each signal of the each tap.

4. The apparatus as claimed in claim 1, further comprising at least one pre-filter having a respective plurality of pre-filter coefficients, wherein:
    the adaptive algorithm unit is arranged also to adapt at least a second predetermined number of the respective plurality of pre-filter coefficients in response to the error signal; and
    the error signal is calculated using at least one output signal from the at least one pre-filter and the output signal from the channel model filter.

5. The apparatus as claimed in claim 4, wherein the channel model filter and the at least one pre-filter are adapted a number of times corresponding to the reduced overall number of states.

6. A terminal comprising the equaliser apparatus as claimed in claim 1.

7. A system comprising at least one terminal as claimed in claim 6.

8. A method of channel estimation for an equaliser apparatus comprising a channel model filter having a plurality of model filter coefficients and a plurality of state-defining taps, and an adaptive algorithm unit configured to adapt at least a first predetermined number of the plurality of model filter coefficients in response to an error signal calculated using an output signal from the channel model filter, wherein the adaptive algorithm unit operates in accordance with a respective state channel estimation technique, the method comprising the steps of:
    reducing a number of states that are allocatable to at least one of the plurality of state-defining taps so as to reduce an overall number of states definable associated with the plurality of state-defining taps, wherein the number of states is reduced by reducing each digit of an octal number to a number represented by superstates, comprising at least one symbol; and
    adapting the channel model filter a number of times corresponding to the reduced overall number of states.

* * * * *